United States Patent Office 2,800,862
Patented July 30, 1957

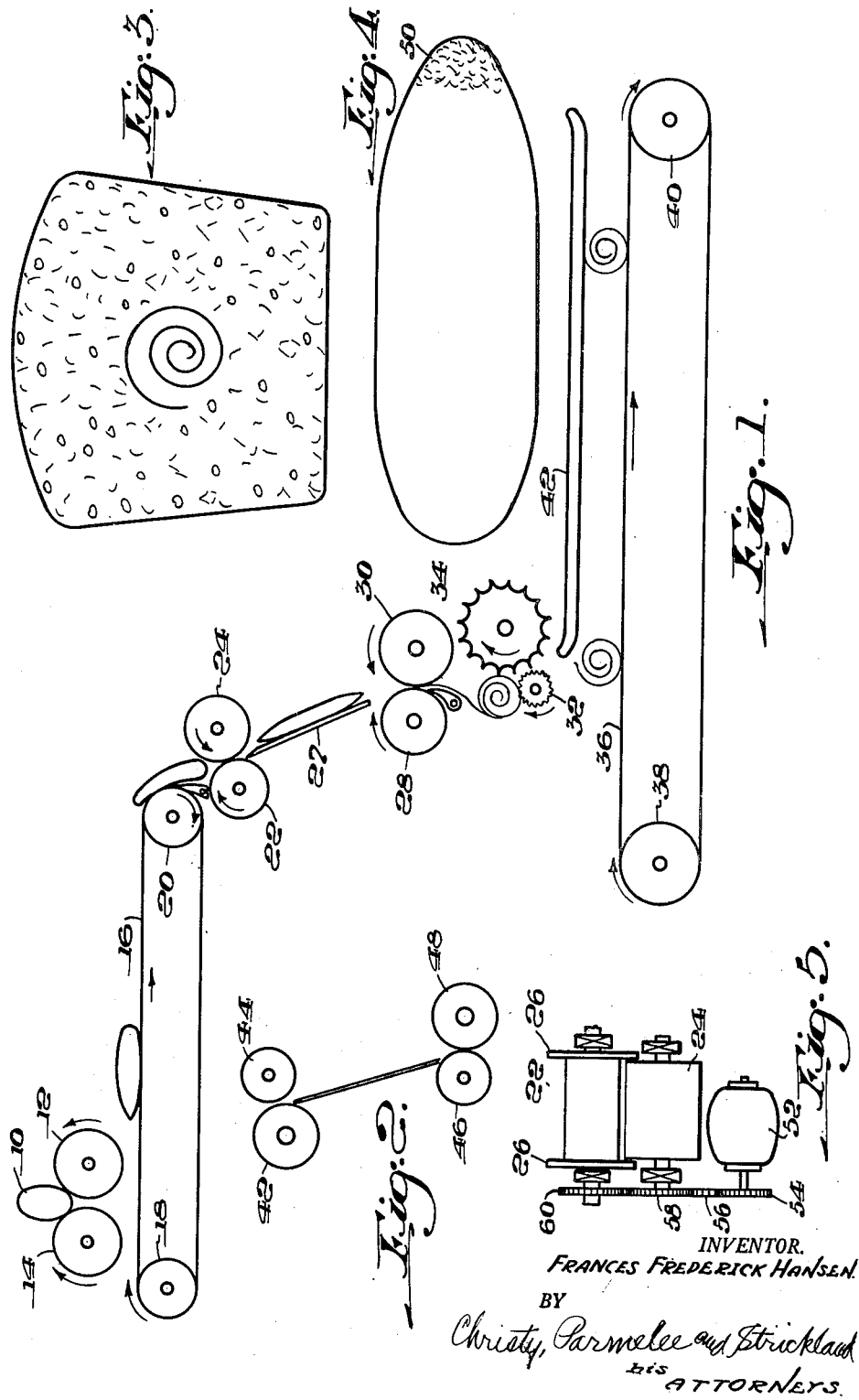

2,800,862
METHOD OF AND APPARATUS FOR FORMING DOUGH INTO LOAVES FOR BAKING

Francis Frederick Hansen, Pittsburgh, Pa.

Application December 12, 1951, Serial No. 261,288

2 Claims. (Cl. 107—12)

This invention relates to the preparation of dough for bread baking. More particularly, the invention relates to the sheeting of partially raised dough to de-gas the dough, to improve its grain and texture and to prepare it for curling so that the dough may be put in form and condition for proofing and baking.

Yeast bread dough as commonly prepared by the bakeries, is put through sheeting rolls to de-gas the dough so that it may be rolled into loaves for baking. Usually three sets of sheeting rolls are used in preparing the dough. The first set of rolls is known as the pre-sheeters, which flattens and elongates the dough to prepare it for treatment by the second set of rolls, which are known as the first sheeting rolls. The first sheeting rolls drastically flattens and elongates the dough to carry out the de-gasing operation. The third set of rolls, known as the second sheeting rolls, further elongates and reduces the dough to a thickness of from ⅛ to ¾ inch, preparatory to the curling operation.

The sheeting rolls are metal rolls, each about four inches in diameter, and rotate in opposite directions to draw the dough between them. The pre-sheeting rolls rotate at a speed of 200 to 250 R. P. M. and as the dough is elongated, the rate of rotation of the first sheeting and second sheeting rolls increases to carry the elongated strip of dough through the rolls in the same unit of time used in the pre-sheeting rolls. The first and second sheeting rolls may rotate at speeds of 275 to 350 R. P. M.

As the dough is sheeted by the rolling and compression operation, the gas is removed from the dough and the protein of the dough is formed into fibrous strands with the strands arranged longitudinally of the dough strip. After the dough is sheeted, it is curled into a roll by one method in which the axis of the roll is perpendicular to the longitudinal axis of the dough strip. In another method of curling, the sheeted material is rolled about an axis parallel to the longitudinal axis of the dough strip.

It has been found that with the conventional method of sheeting and curling, the dough in the loaf formed by curling does not have a uniform consistency and often the bread formed has a core in the center of the loaf. The conventional rolls have a tendency to make the front end of the dough strip comparatively dry. This is due to the fact that the skin of the front end of the dough is not broken, whereas the skin is broken after the first few inches pass through the rolls, and the dough with broken skin has a different texture. When this type of strip is curled into a loaf with its axis at right angles to the longitudinal axis of the strip, the dry end is in the center of the loaf, and this dry end tends to keep its rolled structure, so that the center of a slice of bread will form a core of a different texture from the remainder of the slice of bread. The formation of a loaf by curling the dough strip about its longitudinal axis has been used in order to place the dry end of the strip at the end of the loaf, but the formation of a loaf into this form has a few slices with a core at this dry end. Also this cross curling requires a comparatively complex mechanical structure and a machine which covers a large floor space.

The primary object of the present invention is to provide a method of and apparatus for sheeting bread dough which will produce a curled dough loaf of improved grain and texture characteristics, due to improved de-gasing and kneading operations.

A further object of the invention is to provide a method of and apparatus for sheeting bread dough that may be curled about an axis perpendicular to the longitudinal axis of the sheeted strip of dough and eliminate a core in the bread baked from the curled dough.

In accordance with these objects, an important feature of the invention consists in the use of a shearing or rupturing action on the surface of the dough in forming the sheeting strip in contradistinction to the compressing, kneading and extrusion action now used by the well-known sheeting rolls. This rupturing action is preferably used in conjunction with a kneading compression and extruding action to improve the texture and grain structure. The rupturing action is started near the surface of the dough strip, and continues throughout the body of the strip. By acting on both sides of the dough strip, a comparatively uniform composition may be maintained throughout the length of the strip and avoid the formation of a dry end on the strip.

With this feature in mind, another object of the invention is to provide a method of and apparatus for sheeting bread dough with a combined shearing, compressing and extruding action.

With these and other objects and features in view, the invention consists in the improved bread dough sheeting method and apparatus as illustrated and described in the specification and particularly defined in the appended claims.

The various features of the invention are illustrated in the accompanying drawings, in which:

Fig. 1 is a flow diagram of an apparatus in which the improved dough sheeting operation may be carried out;

Fig. 2 is a diagram of a modified form of sheeting roll which may be used with the apparatus illustrated in Fig. 1;

Fig. 3 is a cross-sectional view of a loaf of bread made from dough which is sheeted with the conventional dough molding machine and has a central core;

Fig. 4 is a diagrammatic view of a dough strip made with a conventional dough molding machine and illustrating the location of the dry end of the strip; and Fig. 5 is a diagrammatic plan view of a sheeting roll drive.

The preferred method of sheeting dough in accordance with the present invention is illustrated in Fig. 1. With this apparatus a roll of dough 10 which is formed and weighed in a conventional weighing machine is introduced between pre-sheeting rolls 12 and 14. The rolls are rotated in opposite directions as indicated in the drawings to force the roll of dough between the rolls to form it into a flattened condition as indicated in the drawing. The flattened roll is received upon a belt 16 which runs between drive pulleys 18 and 20. The belt 16 carries the flattened dough to the first sheeting rolls 22 and 24. The rolls 22 and 24 are rotated in opposite directions and act to draw the dough from the belt between the rolls to drastically lengthen and make the dough thinner.

As shown in Fig. 5, one of the rolls 22 has flanges 26 at each end, and the roll 24 closely fits between the flanges 26. The flanges determine the width of the dough strip, and the strip is made thinner and is elongated by compression and extrusion of the dough as it moves between the rolls. In the present sheeting operation as well as in the usual sheeting operations, the movement of the dough between the rolls, especially when flour is placed on the dough or rolls, tends to form a film or skin on the faces of the sheeting strip. This skin acts to retard the escape of the gas from the dough strip and is one cause of the lack of uniformity in the grain structure of a baked loaf of bread made from the sheeted dough strip.

An important feature of the present invention consists in imparting a rupturing action upon the dough by the first and second sheeting rolls. Accordingly the roll 24 has a larger diameter than the roll 22, both of these rolls being driven at the same R. P. M. Since the surface of the roll 24 moves faster than the surface of the roll 22, a rupturing action starts near the surface of the dough in contact with the roll 24. This rupturing action breaks the skin of the dough starting at the leading end, and is very effective in de-gasing the dough in producing small cells and grain structure. The rupturing and kneading action may be accomplished by acting on either the top or bottom or both surfaces of the strip.

If desired, the roll 24 may have the same diameter as the roll 22, but the driving mechanism for the roll 24 may be selected to give the surface of the roll 24 a faster lineal motion than the surface of the roll 22. In rupturing the bread dough, it has been found that a surface movement of one roll at a rate of ten feet per minute faster than the surface movement of the opposite roll gives a desirable treatment to the dough to give the desired texture and grain structure. It has been found, however, that with rolls, one of which has a surface rate of movement of from five to fifty feet per minute faster than the other roll, will give a desirable sheeting operation for different kinds of bread dough.

Although the sheeting operation may be carried out with one set of rolls, more desirable grain structure and texture may be obtained by the use of two sets of sheeting rolls wherein the elongation and thinning of the dough strip may be more gradual and not all accomplished in passage between one set of rolls. As shown in the drawings, the dough emerging from the rolls 22 and 24 is advanced across a plate 27 to the second sheeting rolls 28 and 30. The roll 30 has a surface movement faster than the roll 28 and performs a rupturing action on the dough as it passes between the rolls. As the dough emerges from the rolls 28 and 30, it comes into contact with a curling roll 32 which is rotated in the direction indicated in the drawing to bring it into contact with the surface of a fluted curling roll 34. The action of the rolls 32 and 34 tends to curl the dough strip to roll the sheet into a simulated round roll, and by the time that the entire strip is rolled, it will be overbalanced from the roll 32 and drop onto a pressing belt 36. The belt 36 passes between drive rolls 38 and 40 and carries the curled dough rolls under a rolling plate 42. The rolling plate consolidates the curled roll and is shaped to make the roll substantially cylindrical so that the dough rolls will be in a condition and shape to be loaded in pans ready for proofing and baking.

With the sheeting rolls illustrated in Fig. 1, the rupturing action is carried out by the rolls 24 and 30 on the same surface of the dough. In Fig. 2 is illustrated two sets of sheeting rolls 43 and 44, and 46 and 48. The roll 43 has a larger diameter than the roll 44, and therefore has the highest rate of surface movement. This roll will act upon the lower surface of the dough strip, while the roll 48 which has the largest diameter of the pair of rolls 46 and 48, will rupture the upper surface of the dough strip. The sheeting rolls illustrated in Fig. 2 will give a strip which has a substantially uniform dough consistency throughout its length, and which does not form the curled core in the center of the loaf of bread, such as illustrated in Fig. 3.

In Fig. 4 is illustrated the dry end 50 of the conventional dough strip made with the conventional sheeting rolls which have the same diameter and rotate at the same speed. With the apparatus of the present invention the dry end 50 is not formed, and therefore the dough may be curled either along the longitudinal axis of the dough strip or along an axis perpendicular to the longitudinal axis of the dough strip. It will be understood that if the dough is to be curled along its longitudinal axis, the strip will be wider and not as long as the strip that is curled about an axis perpendicular to the longitudinal axis of the strip.

In Fig. 5 is illustrated a motor 52 which may be utilized for driving the rolls. This motor has a sprocket wheel 54 which may be connected by means of a sprocket chain 56, with sprockets 58 and 60 which are secured to the axles of the rolls 24 and 22. When the diameter of the roll 24 is larger than the diameter of the roll 22, the sprocket wheels 58 and 60 will have the same diameter and the same number of sprocket teeth. When rupturing action is to be obtained with rolls of the same diameter, then one of the sprocket wheels will have a larger diameter than the other sprocket wheel so that the roll having the largest sprocket wheel will have a surface movement slower than the surface movement of the other roll.

In the drawings, only one motor is illustrated for driving one set of sheeting rolls. It is to be understood that all of the rolls and the conveyors may be driven by a single motor with the use of a continuous sprocket chain and the proper sizes of sprocket gears attached to the axles of the rolls and drive pulleys. With the apparatus of Fig. 1, a single motor would preferably be used for driving the first and second sheeting rolls, the curling rolls and the conveyor 36. A second motor would then be used for driving the pre-sheeting rolls and the conveyor 16.

The preferred form of the invention having been thus described, what is claimed as new is:

1. The method of forming separate dough pieces into respectively different loaves to reduce the apparent swirls at the center of the finished loaf due to a difference in de-gasing the different areas of the dough from which the loaf is formed during sheeting of the dough and the difference in dough skin texture over the sheeted dough, which comprises passing the individual loaf-forming pieces of dough separately through sheeting rolls operating at sufficiently different peripheral speeds to stress the surface skin of the dough and thereby facilitate the release of gas through the surface at the leading end portion of the dough sheet, and thereafter curling the sheet transversely to the direction of its elongation into a loaf, with the leading edge of the sheet at the core of the loaf.

2. Apparatus for sheeting dough comprising sheeting rollers arranged in pairs of two rolls with the rolls of the pair driven at relatively different peripheral speeds, means for delivering pieces of dough of loaf-forming size to the sheeted rolls in spaced relation, and means for individually curling each piece separately into a loaf with the leading edge of the sheet at the core of the loaf.

References Cited in the file of this patent

UNITED STATES PATENTS

| | | |
|---|---|---|
| 402,396 | Bryce et al. | Apr. 30, 1889 |
| 1,249,294 | Sonsthagen | Dec. 4, 1917 |
| 1,270,096 | Baker | June 18, 1918 |
| 1,366,266 | Lauterbur | Jan. 18, 1921 |
| 1,536,224 | Lauterbur et al. | May 5, 1925 |
| 1,745,228 | Parsons | Jan. 28, 1930 |
| 1,800,417 | Van Houten | Apr. 14, 1931 |
| 1,951,549 | Kirchhoff | Mar. 20, 1934 |
| 2,157,192 | Thurlings | May 9, 1939 |
| 2,373,012 | Burdett et al. | Apr. 3, 1945 |
| 2,431,074 | Palmer | Nov. 18, 1947 |
| 2,479,864 | Rhodes | Aug. 23, 1949 |
| 2,526,944 | Grainger | Oct. 24, 1950 |